(12) United States Patent
Akashe et al.

(10) Patent No.: US 7,045,163 B2
(45) Date of Patent: *May 16, 2006

(54) METHOD OF DEFLAVORING SOY-DERIVED MATERIALS

(75) Inventors: Ahmad Akashe, Mundelein, IL (US); Ronald Louis Meibach, Deerfield, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/655,259

(22) Filed: Sep. 4, 2003

(65) Prior Publication Data

US 2004/0161525 A1    Aug. 19, 2004

Related U.S. Application Data

(63) Continuation-in-part of application No. 09/939,500, filed on Aug. 23, 2001, now Pat. No. 6,787,173.

(60) Provisional application No. 60/250,228, filed on Nov. 30, 2000.

(51) Int. Cl.
*A23L 1/20* (2006.01)
(52) U.S. Cl. .................. 426/422; 426/634; 426/656; 426/495
(58) Field of Classification Search ............... 426/656, 426/634, 422, 495
See application file for complete search history.

(56) References Cited

U.S. PATENT DOCUMENTS

| | | |
|---|---|---|
| 3,852,491 A | 12/1974 | Malzahn |
| 3,995,071 A | 11/1976 | Goodnight, Jr. et al. |
| 4,072,670 A | 2/1978 | Goodnight, Jr. et al. |
| 4,088,795 A | 5/1978 | Goodnight, Jr. et al. |
| 4,091,120 A | 5/1978 | Goodnight, Jr. et al. |
| 4,100,024 A | 7/1978 | Adler-Nissen |
| 4,105,803 A | 8/1978 | Peng |
| 4,172,828 A | 10/1979 | Davidson et al. |
| 4,205,090 A | 5/1980 | Maubois et al. |
| 4,211,694 A | 7/1980 | Youngquist |
| 4,420,425 A | 12/1983 | Lawhon |
| 4,432,999 A | 2/1984 | Bily |
| 4,477,480 A | 10/1984 | Seidel et al. |
| 4,478,854 A | 10/1984 | Adler-Nissen et al. |
| 4,497,836 A | 2/1985 | Marquardt et al. |
| 4,530,788 A | 7/1985 | Chang |
| 4,623,550 A | 11/1986 | Willard |
| 4,632,903 A | 12/1986 | Boyce et al. |
| RE32,725 E | 8/1988 | Howard et al. |
| 4,761,186 A | 8/1988 | Schara et al. |
| 4,770,891 A | 9/1988 | Willard |
| 4,908,224 A | 3/1990 | Yoder |
| 5,077,062 A | 12/1991 | Ernster |

(Continued)

FOREIGN PATENT DOCUMENTS

GB    1580051    11/1980

(Continued)

*Primary Examiner*—Anthony Weier
(74) *Attorney, Agent, or Firm*—Fitch, Even, Tabin & Flannery

(57) ABSTRACT

Soy derived materials such as soy milk, soy flour, soy concentrates, and soy protein isolates, are deflavored by adjusting the pH of an aqueous composition of such soy derived materials to about 9 to about 12 to solubilize the soy proteins and to release the flavoring compounds and thereafter passing the pH-adjusted composition to an ultrafiltration membrane having a molecular weight cutoff up to about 50,000 Daltons under conditions at which the flavoring compounds pass through the membrane, leaving the retained soy material with improved flavor.

22 Claims, 11 Drawing Sheets

U.S. PATENT DOCUMENTS

| | | |
|---|---|---|
| 5,100,679 A | 3/1992 | Delrue |
| 5,160,758 A | 11/1992 | Parks et al. |
| 5,433,969 A | 7/1995 | McMindes et al. |
| 5,626,899 A | 5/1997 | Payne et al. |
| 5,658,714 A | 8/1997 | Westfall et al. |
| 5,725,899 A | 3/1998 | Cole et al. |
| 5,780,439 A | 7/1998 | Mendy et al. |
| 5,858,442 A | 1/1999 | Payne et al. |
| 5,936,069 A | 8/1999 | Johnson |
| 6,022,702 A | 2/2000 | Tsumura et al. |
| 6,068,865 A | 5/2000 | Lee et al. |
| 6,126,973 A | 10/2000 | Tsumura et al. |
| 6,136,351 A | 10/2000 | Nauth et al. |
| 6,139,901 A | 10/2000 | Blazey et al. |
| 6,221,423 B1 | 4/2001 | Cho et al. |
| 6,291,009 B1 | 9/2001 | Cohen |
| 6,383,531 B1 | 5/2002 | Gottemoller et al. |
| 6,399,135 B1 | 6/2002 | Gottemoller et al. |
| 6,413,569 B1 | 7/2002 | Borders et al. |
| 6,432,457 B1 | 8/2002 | Jones |
| 6,479,089 B1 | 11/2002 | Cohen |
| 6,495,187 B1 | 12/2002 | Borders et al. |
| 6,528,622 B1 | 3/2003 | Ayers et al. |
| 6,537,597 B1 | 3/2003 | Nakamori et al. |
| 6,582,746 B1 | 6/2003 | Altemueller et al. |
| 6,630,195 B1 | 10/2003 | Muralidhara et al. |
| 6,726,943 B1 | 4/2004 | Prosise et al. |
| 6,787,173 B1 * | 9/2004 | Akashe et al. ............... 426/422 |
| 6,841,184 B1 | 1/2005 | Porter et al. |
| 2001/0055642 A1 | 12/2001 | Cohen |
| 2002/0098276 A1 | 7/2002 | Porter et al. |
| 2002/0102339 A1 | 8/2002 | Akashe et al. |
| 2002/0102346 A1 | 8/2002 | Stark et al. |
| 2002/0106437 A1 | 8/2002 | Karleskind et al. |
| 2002/0106440 A1 | 8/2002 | Porter et al. |
| 2002/0114877 A1 | 8/2002 | Stark et al. |
| 2004/0161512 A1 | 8/2004 | Akashe et al. |
| 2004/0170743 A1 | 9/2004 | Akashe et al. |
| 2004/0170744 A1 | 9/2004 | Akashe et al. |
| 2004/0175474 A1 | 9/2004 | Akashe et al. |
| 2004/0175479 A1 | 9/2004 | Akashe et al. |
| 2004/0253355 A1 | 12/2004 | Akashe et al. |

FOREIGN PATENT DOCUMENTS

| | | |
|---|---|---|
| WO | WO 02/100186 | 12/2002 |
| WO | WO 03/070007 A2 | 8/2003 |

\* cited by examiner

METHOD OF DEFLAVORING SOY-DERIVED MATERIALS

The present application is a continuation-in-part application of U.S. patent application Ser. No. 09/939,500, filed Aug. 23, 2001 now U.S. Pat. No. 6,787,173, which was based on, a claimed benefit of, U.S. Provisional Application Ser. No. 60/250,228, filed on Nov. 30, 2000, both of which are hereby incorporated by reference.

BACKGROUND OF THE INVENTION

This invention relates generally to the processing of soy-derived materials for use in various food products. More particularly, the invention relates to a method of deflavoring soy materials in order to make them acceptable in a wide range of foods.

In recent years, soy proteins have become widely used in food products, for the health benefits to be obtained from their use. In some applications, the taste of the soy materials is not objectionable. However, in some uses, such as dairy analog products, beverages and the like, the flavors found in soy materials may prevent their ready acceptance by the consumer. Thus, in order to extend the uses of soy materials, the present inventors wanted to find a method of reducing the flavor components of soy materials. However, it was not evident that methods which had been used previously to remove flavor components from other organic materials would be successful in the treating of soy materials. Organic materials, since they have complex compositions, must be tested to determine whether any given method of treating them will be satisfactory.

One example of previously employed methods to purify organic materials is found in U.S. Pat. No. 4,477,480, in which the patentees show that starch can be treated with an alkali to remove objectionable flavor components. In a commonly assigned patent, U.S. Pat. No. 4,761,186, ultrafiltration is used to purify starch. In both cases, flavor components are removed from the starch, in the '480 patent by solubilizing the flavor components so that they can be washed out of the relatively insoluble starch. In the '186 patent, ultrafiltration was used to remove the flavor components as permeate, while the insoluble starch remained in an aqueous slurry. By contrast, the present invention separates flavor components from soluble high molecular weight soy proteins.

There are many articles and patents which relate to processing soy materials in order to recover the protein content and which at the same time reduce the flavor compounds to make the proteins more acceptable in food products. However, these previous disclosures were not specifically directed to removal of flavoring compounds and recovering as much of the protein as possible. One example is U.S. Pat. No. 4,420,425 in which protein components of soy are solubilized at a pH of 7 to 11, preferably about 8 and, after ultrafiltration through a membrane having a molecular weight cut off above 70,000, are recovered by spray drying the retained soy proteins. In variants, only a portion of the protein is solubilized at lower pH values and subjected to ultrafiltration with a membrane having a cutoff preferably above 100,000 molecular weight, the product was found to have improved color and flavor. A higher cutoff valve would be expected to result in a loss of valuable proteins. In another patent, U.S. Pat. No. 5,658,714, a soy flour slurry is pH-adjusted to the range of 7 to 10 to solubilize proteins, which are then passed through an ultrafiltration membrane and phytate and aluminum are retained, presumably as solids. While the molecular weight cutoff of the membrane was not given, it is assumed that the pore size was large in order to be able to pass the soluble proteins. Both of these patents contain extensive discussions of the efforts of others in the processing of soy materials; neither teaches or suggests the control of pH during the ultrafiltration process.

In a group of related patents, Mead Johnson Company disclosed processes for solubilizing soy proteins by raising the pH of an aqueous solution of soy materials and recovering the proteins which are said to have a bland taste. The processes are principally directed to concentrating proteins rather than removing flavor compounds. In U.S. Pat. No. 3,995,071, the pH was increased to 10.1 to 14 (preferably 11 to 12) to solubilize soy proteins, after which the pH was lowered to about 6 to 10 and ultrafiltration with a membrane having a molecular weight cutoff of 10,000 to 50,000 Daltons was used to retain the proteins while discarding carbohydrates and minerals. In U.S. Pat. No. 4,072,670, emphasis was placed on removing phytates and phytic acid by solubilizing proteins at a pH of 10.6 to 14 and a temperature of 10 to 50° C. to make the phytates and phytic acid insoluble, then separating them and finally acidifying the solution to a pH of about 4 to 5 to precipitate the soy proteins. In U.S. Pat. No. 4,091,120 soy proteins were solubilized at a pH less than 10, preferably 7 to 9, and ultrafiltration was used to separate the proteins as retentate, while passing carbohydrates as permeate. These patents do not teach or suggest control of the pH during the ultrafiltration process.

The present inventors wanted to remove compounds in soy materials which contribute color and flavor and which interfere with the use of soy in certain food products such as beverages, dairy analogs, and the like. They have found that soy-derived materials can be treated successfully using the process to be described below, recovering substantially all of the proteins and rejecting the compounds which cause undesirable color and flavor.

Moreover, by controlling the pH within the range of about 9 to about 12 during the ultrafiltration process, deflavored soy materials having improved functional properties can be obtained. Thus, the product is suitable for many food products.

SUMMARY OF THE INVENTION

Broadly, the invention is a process for preparing an aqueous soy composition having a soy concentration of about 1 to about 20 percent, which is pH-adjusted to solubilize the protein content and to release the flavoring compounds. Then the composition is subjected to ultrafiltration, while maintaining pH control, using a membrane capable of retaining substantially all of the protein content of the soy while removing flavoring components as permeate.

The deflavored soy materials prepared by the present methods are ideally suited for use in dairy and non-dairy beverages, smoothies, health drinks, confectionary type products, nutritional bars, cheeses, cheese analogs, dairy and non-dairy yogurts, meat and meat analog products, cereals, baked products, snacks, and the like.

In one aspect, the invention is a method of deflavoring soy-derived materials such as soy milk, soy flour, soy concentrates, and soy protein isolates, which method includes preparing an aqueous composition of the soy material containing flavoring compounds, adjusting the pH to the range of about 9 to about 12 to solubilize the protein content of the soy material and release the flavor components, and then passing the pH-adjusted composition adjacent to an ultrafiltration membrane having pores which provide a molecular weight cutoff up to 50,000 Daltons, while maintaining the pH in the range of about 9 to about 12, thus retaining substantially all of the protein content, while passing through the pores the flavor producing compounds.

In another aspect, the invention includes adjusting the pH to the range of about 9 to about 12 with an alkali such as sodium, potassium or calcium hydroxides to solubilize the protein content and releasing the flavor compounds, making it possible to separate such compounds by ultrafiltration. Importantly, the pH is also controlled within the range of about 9 to about 12 during the ultrafiltration process.

In one embodiment, the invention is a method for deflavoring soy materials in a continuous process wherein a pH-adjusted aqueous mixture of soy materials is passed adjacent an ultrafiltration membrane to separate the flavor components. The pH is maintained at about 9 to about 12 during the ultrafiltration by the addition of the appropriate amount of an appropriate pH-altering material (generally a base). The permeate containing flavor components and water is passed adjacent a reverse osmosis membrane to dewater the permeate and the separated water is recycled to join recycled retentate and fresh pH-adjusted soy materials. A portion of the retentate is continually removed and the deflavored soy materials recovered.

In a preferred embodiment, the invention is a method for deflavoring soy materials in a batch or semi-continuous process wherein a pH-adjusted aqueous mixture of soy materials is passed adjacent an ultrafiltration membrane, the permeate is separated for recovery of the flavor components, and the retentate is recycled to join fresh pH-adjusted soy materials. Water is added periodically or continuously to replace the water lost to the permeate and to adjust the concentration of soy materials in the combined stream to a predetermined level. If necessary, a pH-altering material (e.g., a base) can be added to the recycled retentate or added water to control the pH to the desired range during the ultrafiltration process. The process is continued until all of the flavoring compounds have been removed.

In another preferred embodiment, the present invention provides a method for preparing deflavored soy protein material, said method comprising:

(a) preparing an aqueous composition of a soy material containing soluble soy proteins, flavoring compounds, and insoluble materials;

(b) solubilizing the soy proteins by adjusting the aqueous composition of (a) to a pH in the range of about 9 to about about 12 and releasing the flavoring compounds;

(c) removing the insoluble materials from the pH-adjusted aqueous composition of (b) to obtain a treated aqueous composition;

(d) passing the treated aqueous composition of (c) adjacent an ultrafiltration membrane having a molecular weight cutoff up to about 50,000 Daltons, while maintaining the pH in the range of about 9 to about 12, under suitable ultrafiltration conditions wherein the flavor compounds pass through the membrane, thereby deflavoring the soy material and retaining substantially all of the solubilized soy proteins; and (e) recovering the solubilized soy proteins retained by the ultrafiltration membrane to obtain the deflavored soy protein material.

The ultrafiltration membrane used in the method of the invention will have a molecular weight cutoff up to 50,000 Daltons, pref rably 1,000 to 50,000, most preferably about 10,000 and preferably is a polyethersulfone or ceramic membrane.

DESCRIPTION OF THE PREFERRED EMBODIMENTS

Figure 1:
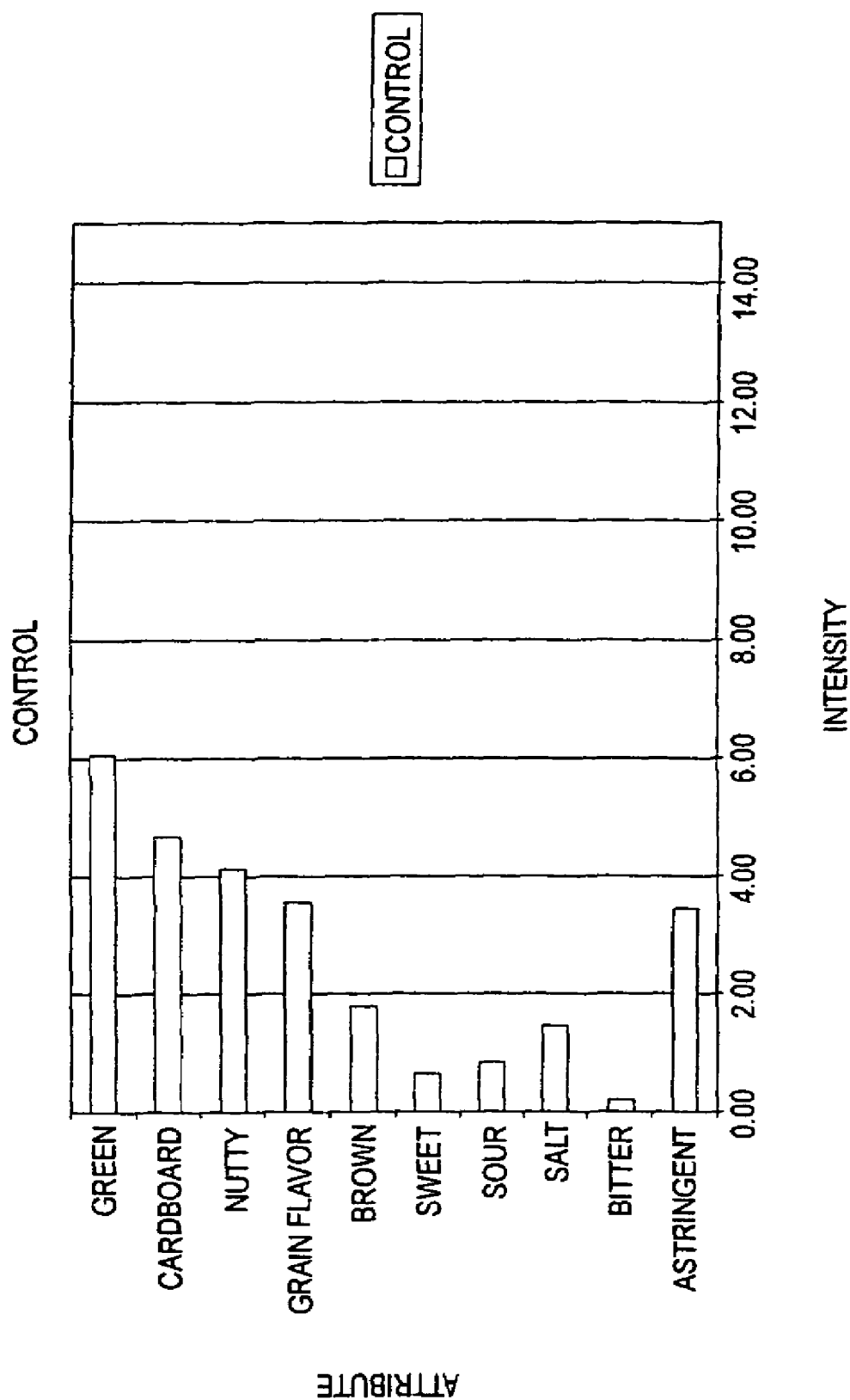
FIG. 1 is a graph of the intensity of soy flavor attributes.

Soy-Derived Materials. Soybeans are valuable sources of oil and, in the present invention, of proteins. Soybeans contain about 40 percent proteins, which have been classified after ultracentrifugation as 2S, 7S, 11S and 15S (see also U.S. Pat. No. 4,420,425). These fractions may contain other materials as well and they have a wide molecular-weight range, from 3,000 to 600,000. It is well known that soy products have undesirable odors and flavors which should be removed in order to make the soy materials widely useful in food products. It is believed that lipoxygenases catalyze the oxidation of certain polyunsaturated fatty acids, producing hydroperoxides which are degraded into volatile carbonyl compounds, associated with objectionable odors and flavors in soy-derived materials. Some of the compounds associated with soy flavors are described in Table C in Example 10 below.

While the protein content of soy-derived materials is considered a valuable fraction for use in food products, soluble carbohydrates are considered undesirable. Their removal from soy protein fractions is an objective in many processes in which the proteins are recovered.

Phytates are compounds which also are considered undesirable in soy proteins. These compounds are calcium-magnesium-potassium salts of inositol hexaphosphoric acid. Such compounds are believed to chelate metal ions and are not readily absorbed by the human body. They are considered to bind to soy proteins and interfere with digestion. As mentioned above, removal of phytates has been an objective of workers in the field of soy-derived materials.

Ultrafiltration Membranes. Filtration is used to separate many materials. In the present invention, ultrafiltration is used to remove flavoring compounds from soy-derived materials. Importantly, the pH of the soy-derived material should be maintained in the range of about 9 to about 12 during the ultrafiltration process. Ultrafiltration is intended to remove particles having a size between 10 to 1,000 Angstroms (0.001 to 0.1 μm), corresponding generally to particles having a molecular weight between 10,000 and 1,000,000, and which may also be affected by the shape of such high molecular weight particles. Soy proteins have molecular range between about 3,000 and 600,000. A membrane may be chosen which is capable of passing all of the soy proteins or only a selected portion. In the present invention, the soy proteins are retained by the ultrafiltration membrane under the selected operating conditions, while the lower molecular weight flavoring compounds pass through the membran and are separated, thus improving the color and flavor of the retained soy proteins and associated solids.

A polymer ultrafiltration membrane may be defined as an anisotropic (non-uniform) layer. One face is a skin containing pores which determine the size of molecules which can pass through the membrane. Supporting the surface skin is a spongy structure which extends to the opposite face. Such membranes are commonly made by coagulation of polymers in an aqueous bath. Typical polymers which are used include polysulfones, cellulose esters, poly(vinyldenefluoride), poly (dimethylphenylene oxide), poly (acrylonitrile), which can be cast into membranes. Often, the membranes are formed into hollow tubes which are assembled into bundles, through which the solution to be filtered is passed. Alternatively, flat membrane sheets and spiral designs may be used. In commercial practice, pressure is applied to facilitate movement of the lower molecular weight compounds through the membrane. The membrane must be able to withstand the pressures used, making it important that the spongy supporting structure be uniform to avoid breaking the surface skin and bypassing the membrane.

In addition to the polymeric membranes just described, other materials have been used to make ultrafiltration membranes, such as ceramics, sintered metals, and other inorganic materials. The present invention is not limited to any particular type of membrane. In general, the membrane must be able to pass the flavoring compounds, which are believed to have molecular weights lower than 1,000 Dalton. More importantly, the membranes must be able to retain substantially all of the solubilized soy proteins. Thus, the membrane of the invention will have a molecular weight cutoff up to about 50,000 Daltons, preferably about 1,000 to 50,000 Daltons, more preferably 10,000 to 30,000 Daltons.

Process. The process of the invention includes the following steps:

(1) Prepare an aqueous mixture of the soy-derived material;

(2) Add a base to raise the pH of the aqu ous mixture to about 9 to about 12 in ord r to solubilize the soy proteins and to release the flavoring compounds;

(3) Pass the pH-adjusted mixture, while maintaining the pH in the range of about 9 to about 12, adjacent to an ultrafiltration membrane having a molecular weight cutoff up to about 50,000 Daltons, remove the flavoring compounds as permeate, and remove the remaining soy proteins and other soy materials as retentate; and (4) Neutralize the retentate and recover the soy proteins.

All types of soy materials are considered to be potential sources of soy for use in food products. Thus, soy materials which contain proteins are combined into an aqueous mixture, generally a slurry of soy solids. The protein content is needed for food products, but as discussed above, it is believed to contain flavoring compounds which must be released in order that they can be separated. The separation of flavoring compounds is carried out in an aqueous mixture in which both the proteins and flavoring compounds are dissolved. The concentration of the soy materials in the aqueous mixture will be in the range of about 1 to about 20 percent. Generally, the concentration of soy materials after pH adjustment will change during the subsequent ultrafiltration step as water is removed with the permeate. The water will be replaced either periodically or continuously. For example, in diafiltration water is added to gradually dilute the retained proteins in a batch or semi-continuous process.

The second step, as will be seen in the examples, is important if removal of the flavoring compounds is to be accomplished. The soy proteins are solubilized by adding a base to the aqueous mixture to achieve a pH of about 9 to about 12. In general, it has been found that a pH of about 9 is needed to solubilize all of the proteins, while a pH higher than about 12 is likely to cause undesirable degradation of the proteins. While in theory, any base might be used, sodium or potassium hydroxide are preferred, particularly potassium hydroxide. Other bases which may have application include calcium, magnesium and ammonium hydroxides. It is believed that solubilizing the soy proteins changes their shape and in some manner results in releasing the flavoring compounds, which may be bound or encapsulated by the soy proteins when they are in a neutral or acid solution. The flavoring compounds, which have relatively low molecular weight compared to the soy proteins are able to pass through the pores of the ultrafiltration membrane, while substantially all of the solubilized soy proteins are too large and are retained. Importantly, the pH should be maintained within the just described range (i.e., about 9 to about 12) during the ultrafiltration/diafiltration process to allow as much of the flavoring compounds as possible to be removed.

The third step could be carried out in a batch manner similar to the laboratory experiments reported below in Examples 1–5 in which the flavor compounds and water passed through the membrane and were removed by flowing water. However, in commercial applications of the process of the invention, the pH-adjusted aqueous mixture would be circulated continuously adjacent to an ultrafiltration membrane. Since water, the caustic and the flavoring compounds pass through the membrane as permeate and are discarded, additional water will be added to maintain the desired concentration of soy materials, which will tend to lower the pH of the aqueous mixture. This water may be augmented by dewatering the permeate and recycling the recovered water to the feed stream. A pH-modifying material (e.g., base) can be added as necessary to control the pH in the desired range (i.e., about 9 to about 12) directly to the ultrafiltration solution, to any recycled aqueous material, or to makeup water as desired.

After removal of the flavoring compounds (i.e., after completion of the ultrafiltration process), further neutralization of the filtered solution may be accomplished by withdrawing product and adding an acid as required to reach the desired pH. After pH adjustment, the aqueous mixture of soy proteins and other materials may be used directly in food products, or it may be concentrated or dried as required for the intended use.

Figure 8:
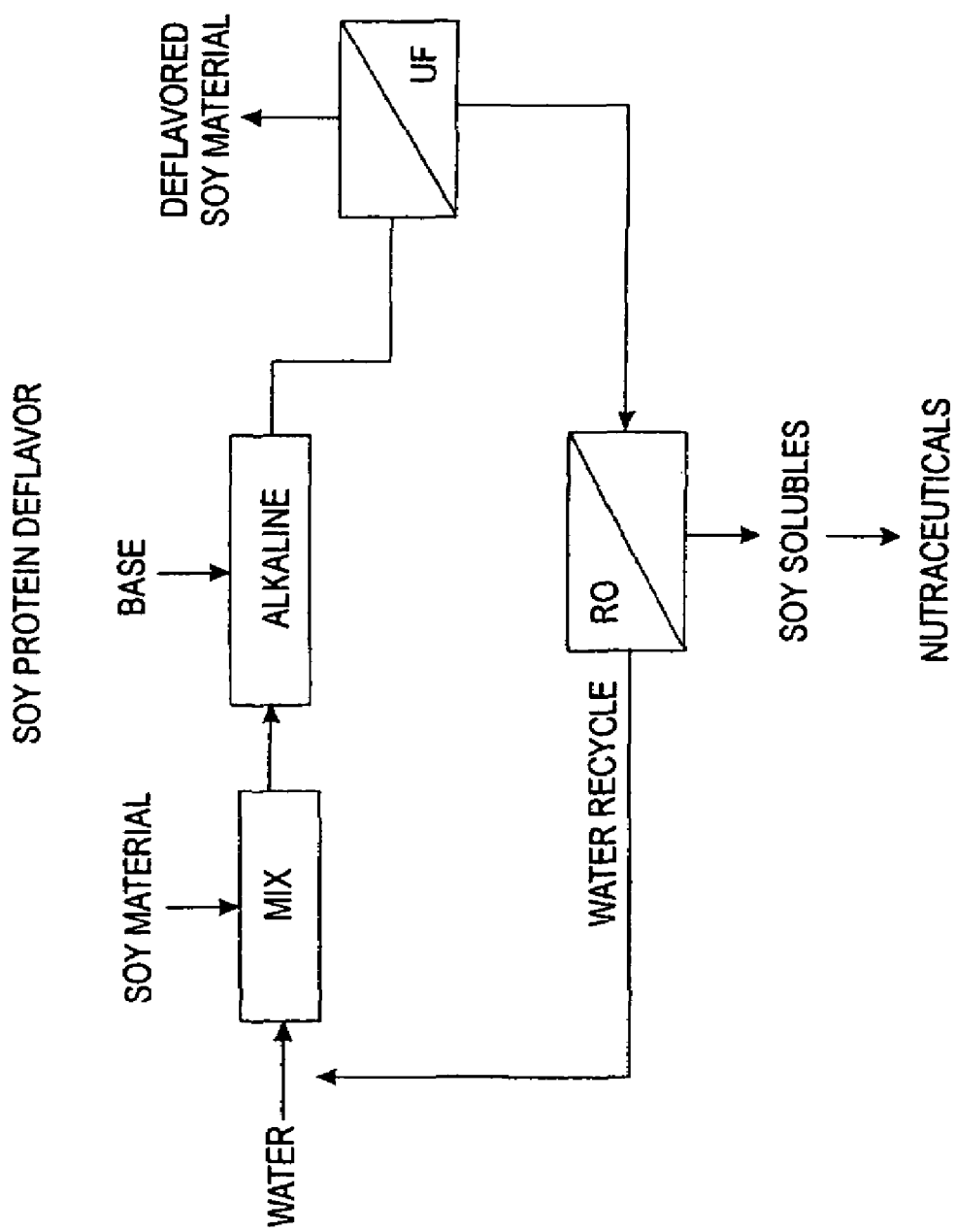
FIG. 8 is a block diagram of one process employing the invention.

A process for deflavoring soy materials by ultrafiltration may be operated in various ways. The pH during the ultrafiltration/diafiltration process is maintained in the range of about 9 to about 12, and preferably in the range of about 9.5 to about 10.5. Two methods will be described, continuous processing and batch (including semi-continuous operation) processing. It is expected that commercial processes will adopt batch or semi-continuous operation, which should be better suited to production of food-grade soy products. A continuous process is generally shown in FIG. 8. In either a continuous or batch process an aqueous mixture of soy materials is pH adjusted to solubilize soy proteins and release flavor compounds and then passed adjacent an ultrafiltration membrane which permits the lower molecular weight flavoring materials to pass through its pores along with water (the permeate), leaving the higher molecular weight soy materials (the retentate) to be recirculated. A portion of the retentate will be withdrawn as deflavored product, from which the soy materials can be recovered as needed for the ultimate end use. Water will be added to replace that lost in the permeate and to provide a constant concentration of soy materials in the feed stream supplied to the ultrafiltration membrane. Although not essential to the process, the process of FIG. 8 includes additional processing of the permeate to recover a portion of the water using a reverse osmosis membrane for recycling to join the retentate and fresh soy materials. The advantage of such a step is in reducing the amount of fresh water which must be added to the process and removed in concentrating the permeate. Of course, the pH of the soy-derived materials can be kept within the desired range by appropriate addition of a base to the recycled or fresh water added to the process or by direct addition of base as desired.

In a batch process, such as those described in Examples 6–8 below, a batch of soy material is placed in a vessel, pH adjusted, and fed to an ultrafiltration membrane. The permeate is separated and the retentate is returned to the vessel. As the process proceeds, the soy material is depleted in the lower molecular weight flavoring compounds and water and becomes more concentrated in the desirable soy proteins. Periodically, water is added to the retentate to dilute it and provide a carrier for the flavoring compounds which are passed through the membrane. In a semi-continuous process the water is added continuously at the rate it is being removed in the permeate. The process is continued until all of the flavoring compounds have been removed and the retentate is sufficiently deflavored to become the product, which can be further processed as required for the ultimate end use. A batch or semi-continuous process may also include the concentration of the permeate, with recycle of separated water in a similar manner as that shown in FIG. 8. The pH during the ultrafiltration/diafiltration process is maintained in the range of about 9 to about 12, and preferably in the range of about 9.5 to about 10.5.

The ultrafiltration membrane will be operated with a pressure differential across the membrane which assists migration of the flavoring compounds, water and other materials which are capable of passing through the pores of the membrane, while not exceeding the physical strength of the membrane. Typical average pressure for such membranes are about 50 psi (345 kPa). The trans-membrane pressure (in versus out) will be about 15 psi (103 kPa). Of course, these pressures could be varied based on the membrane's specifications and other operational concerns. The flow rate of the feed stream will provide sufficient residence time for significant permeate removal, but also will be high enough to provide turbulence so that the access of the feed stream to the membrane pores will not be hindered by solid deposits on the membrane walls. One skilled in the art will understand that suitable operating parameters will be determined by experience with the materials being separated.

In a preferred embodiment, the present invention provides a method for preparing deflavored soy protein material, said method comprising: (a) preparing an aqueous composition of a soy material containing soluble soy proteins, flavoring compounds, and insoluble materials; (b) solubilizing the soy proteins by adjusting th aqueous composition of (a) to a pH in the range of about 9 to about 12 and releasing the flavoring compounds; (c) removing the insoluble materials from the pH-adjusted aqueous composition of (b) to obtain a treated aqueous composition; (d) passing the treated aqueous composition of (c) adjacent an ultrafiltration membrane having a molecular weight cutoff up to about 50,000 Daltons, while maintaining the pH in the range of about 9 to about 12, under suitable ultrafiltration conditions wherein the flavor compounds pass through the membrane, thereby deflavoring the soy material and retaining substantially all of the solubilized soy proteins; and (e) recovering the solubilized soy proteins retained by the ultrafiltration membrane to obtain the deflavored soy protein material.

Figure 11:
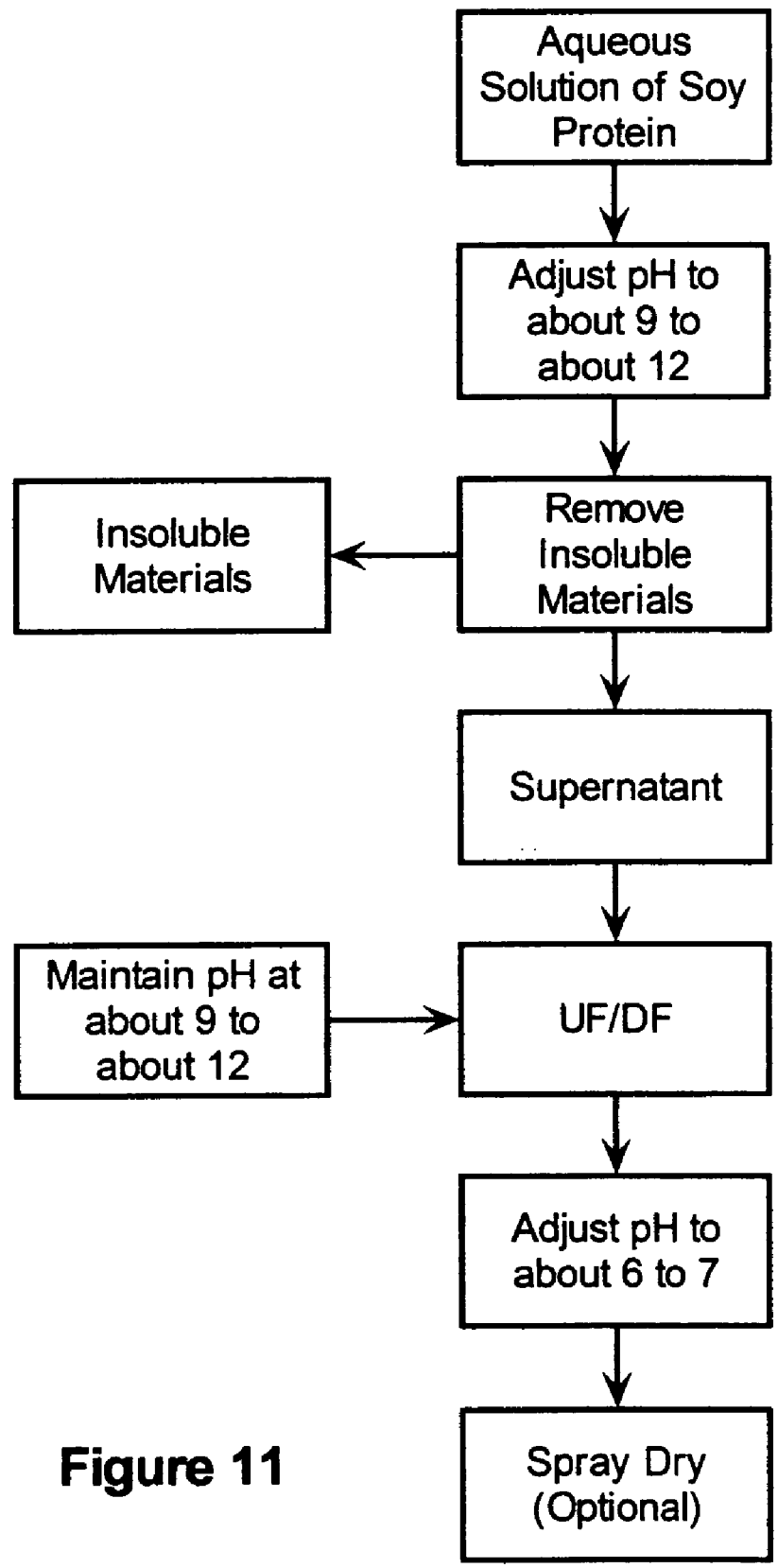
FIG. 11 is a block diagram of a preferred embodiment of the invention.

This preferred embodiment is illustrated in FIG. 11 wherein the pH of an aqueous solution of soy protein is adjusted to about 9 to about 12. The pH-adjusted aqueous solution is then treated to remove insoluble materials. Any conventional technique (e.g., filtration, decantation, centrifugation, and the like) can be used. Preferably, the insoluble material is removed by centrifugation. Commercial available continuous centrifugation units are ideally suited for this separation in a semi-batch or continuous type operation. In an especially preferred embodiment, the pH-adjusted aqueous is subjected to the removal technique (e.g., centrifugation) at least twice in order facilitate or more complete removal of insoluble materials. The treated supernatant is then subjected to ultrafiltration, preferably combined with diafiltration, in order to remove the flavor components normally associated with soybeans. During ultrafiltration, the pH of the soy-derived material should be maintained in the range of about 9 to about 12. After ultrafiltration, the pH is adjusted to a neutral pH using an edible acid (e.g., citric acid). The deflavored soy protein solution may be used directly or it may be converted to a solid form if desired. Any conventional technique for removing water can be used. Generally, spray or freeze drying techniques are preferred.

Deflavored Soy Protein Products. The deflavored soy materials prepared by the present methods are ideally suited for use in dairy and non-dairy beverages, smoothies, health drinks, cheeses, cheese analogs, dairy and non-dairy yogurts, meat and meat analog products, cereals, baked products, snacks, and the like.

Unless noted otherwise, all percentages are by weight.

EXAMPLE 1

Soy protein isolate (Protein Technology International (PTI); St. Louis, Mo.) was hydrated in tap water to provide a concentration of 10 percent. The aqueous composition was mixed with a magnetic stirrer until all of the soy protein isolate was completely dispersed. The pH of the mixture was adjusted to 11.0 using sodium hydroxide. Then, the pH-adjusted composition was placed in a dialysis tube (Spectrum, Inc.) having a 3500 molecular weight pore size and tap water was passed over the outside of the tube continuously for about 4 hours; the pH remained greater than about 9 during dialysis. The composition remaining in the dialysis tube was poured into a glass beaker, neutralized, and evaluated for aroma and taste. A comparison was made with the dialyzed composition and a sample treated in a similar manner, but which had a pH of 6.7 and a second sample which had been neither dialyzed nor pH-adjusted. Blind evaluation by several individuals showed that only the pH-adjusted and dialyzed sample had significantly improved taste and aroma.

EXAMPLE 2

A similar test was carried out using soy milk (Devansoy Farms, Carrol, Iowa) made into a 10 percent aqueous composition and then pH-adjusted and dialyzed overnight as in Example 1. After the treatment, the pH of the sample was 8.8 and the aroma and taste were significantly improved.

EXAMPLE 3

Example 2 was repeated with soy milk freshly prepared by soaking and blanching the beans and then grinding and separating the soy milk from the meal. After pH adjustment and dialysis as previously described, it was found that the taste and aroma of the soy milk was significantly improved.

EXAMPLE 4

Example 3 was repeated using a dialysis tube having a pore size of 6000 molecular weight and similar results were obtained.

EXAMPLE 5

Example 2 was repeated with dry soy flour (Cargill). The soy flour was hydrated to a 10 percent composition and then pH-adjusted as previously described. After dialyzing overnight the pH of the remaining composition in the dialysis tube had a pH of 8.7 and had significantly improved aroma and taste.

EXAMPLE 6

In a large mixing tank 33 pounds (15 kg) of Sun Rich soy milk containing 15 percent solids was diluted with 66 pounds (30 kg) of water to produce a slurry of 100 pounds (45 kg) containing 5 percent soy solids. A 1N NaOH solution was added slowly to solubilize the soy proteins until a pH of 11 was reached.

A diafiltration of the alkalized soy solution was carried out by pumping the solution from the mixing tank through two parallel hollow fiber membranes (A/G Technology Corporation) having a molecular weight cutoff of 10,000 Daltons and a surface area of 3.3 m². The trans-membrane pressure across the membranes was 20–50 psi (138–345 kPa). The material passed through the membrane (permeate) was collected. The remaining material (retentate) was continuously recycled to the mixing tank. When 50 pounds (22.7 kg) of permeate had been collected, the mixing tank contained 50 pounds (22.7 kg) of soy solution. An additional 50 pounds (22.7 kg) of water was added to the mixing tank. The pH was maintained at about 9 to about 12 during ultrafiltration/diafiltration. This washing with addition of water to the mixing tank was repeated five times, after which the solution in the mixing tank was concentrated to about 10 percent solids as water was removed in the permeate and then the retained soy solution was neutralized with 2 percent citric acid to a pH of 7.0.

The neutralized solution was evaluated by a trained sensory panel and compared with a control sample of Sun Rich soy milk which had been diluted to 10 percent with water, but not otherwise treated. The soy solutions were presented in a blind and randomized order. The results are shown in the graphs of FIGS. 1 and 2.

Figure 2:
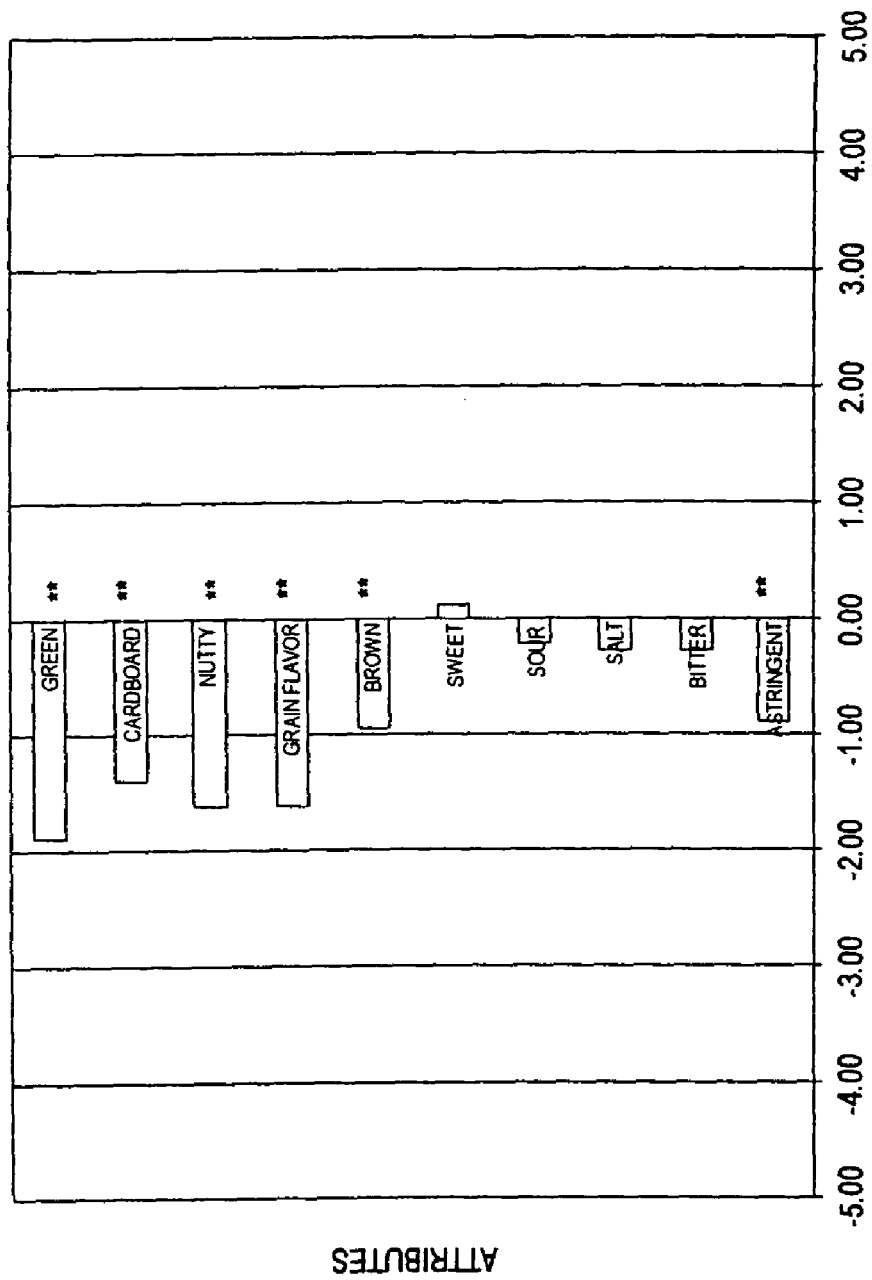
FIG. 2 is a graph of the intensity of deflavored soy milk compared to a control sample.

FIG. 1 shows the mean intensity score for 10 attributes. The panel judged certain attributes to be more significant than others. When compared to the soy solution which had been treated as described above, the outstanding attributes had all been reduced with a 95 percent confidence level. Those attributes which had less prominent in the control (i.e., Brown, Sweet, Sour, Salt and Bitter) were reduced, except for Sweet which increased in value, but the panel mean values did not reach a 95 percent confidence level.

It is clear from the results that the soy solution had been rendered more neutral in flavor by removal of flavor components.

EXAMPLE 7

Ten pounds (4.55 kg) of a soy protein concentrate (Central Soya) was mixed with 190 pounds (86.4 kg) of water in a tank with high agitation for 15–30 minutes to hydrate the soy protein. Then 1 N NaOH was added to solubilize the soy protein to a pH of 11. In a similar manner to that described in Example 6 the soy slurry was pumped through a spiral membrane (Gea Niro Inc.) having a molecular weight cutoff of 10,000 Daltons. The trans-membrane pressure across the membrane was maintained below 50 psi (344.7 kPa). The pressure drop through the membrane was maintained below 15 psi (103.4 kPa) and the pH was maintained at about 9 to about 12. As in Example 6, five additions of water were made when the permeate withdrawn from the membrane reached one-half of the original volume in the mixing tank. After five water additions the pH of the washed soy solution was adjusted to 7.5 by adding 0.5 N HCl and then freeze dried for sensory evaluation.

Figure 3:
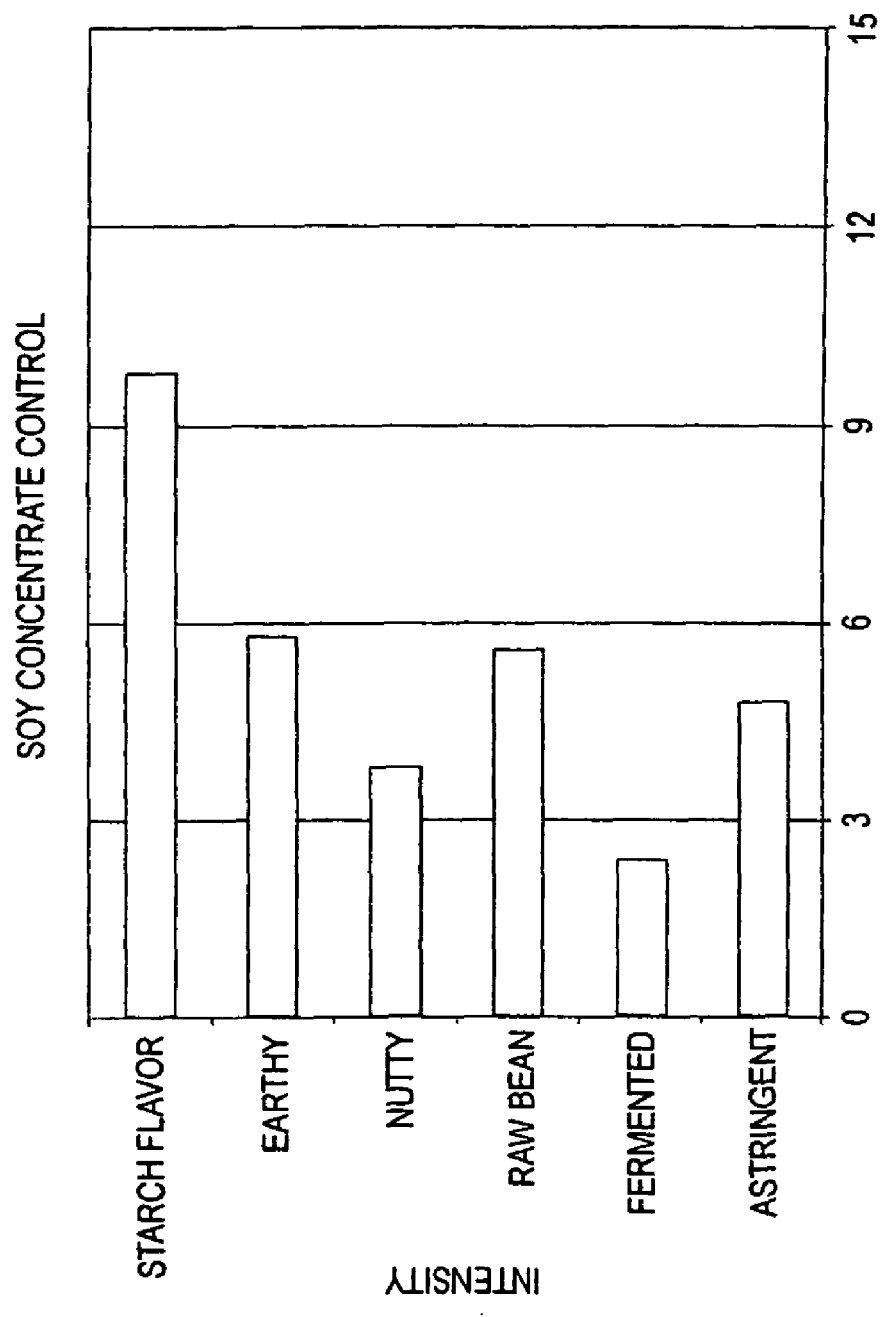
FIG. 3 is a graph of the intensity of another group of soy flavor attributes.
Figure 4:
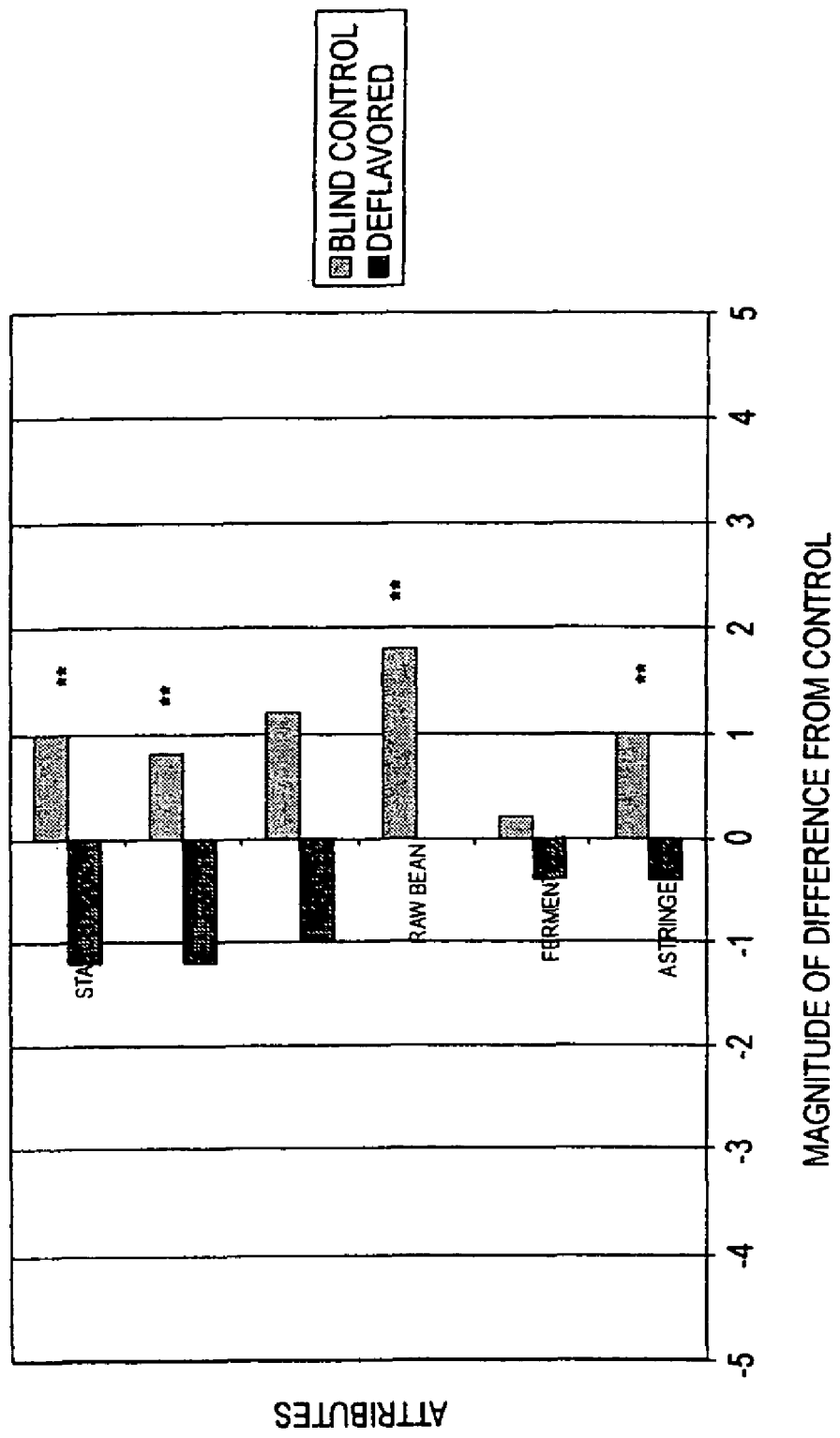
FIG. 4 is a graph of the intensity of deflavored soy concentrate and a control sample compared to the sample of FIG. 3.
Figure 5:
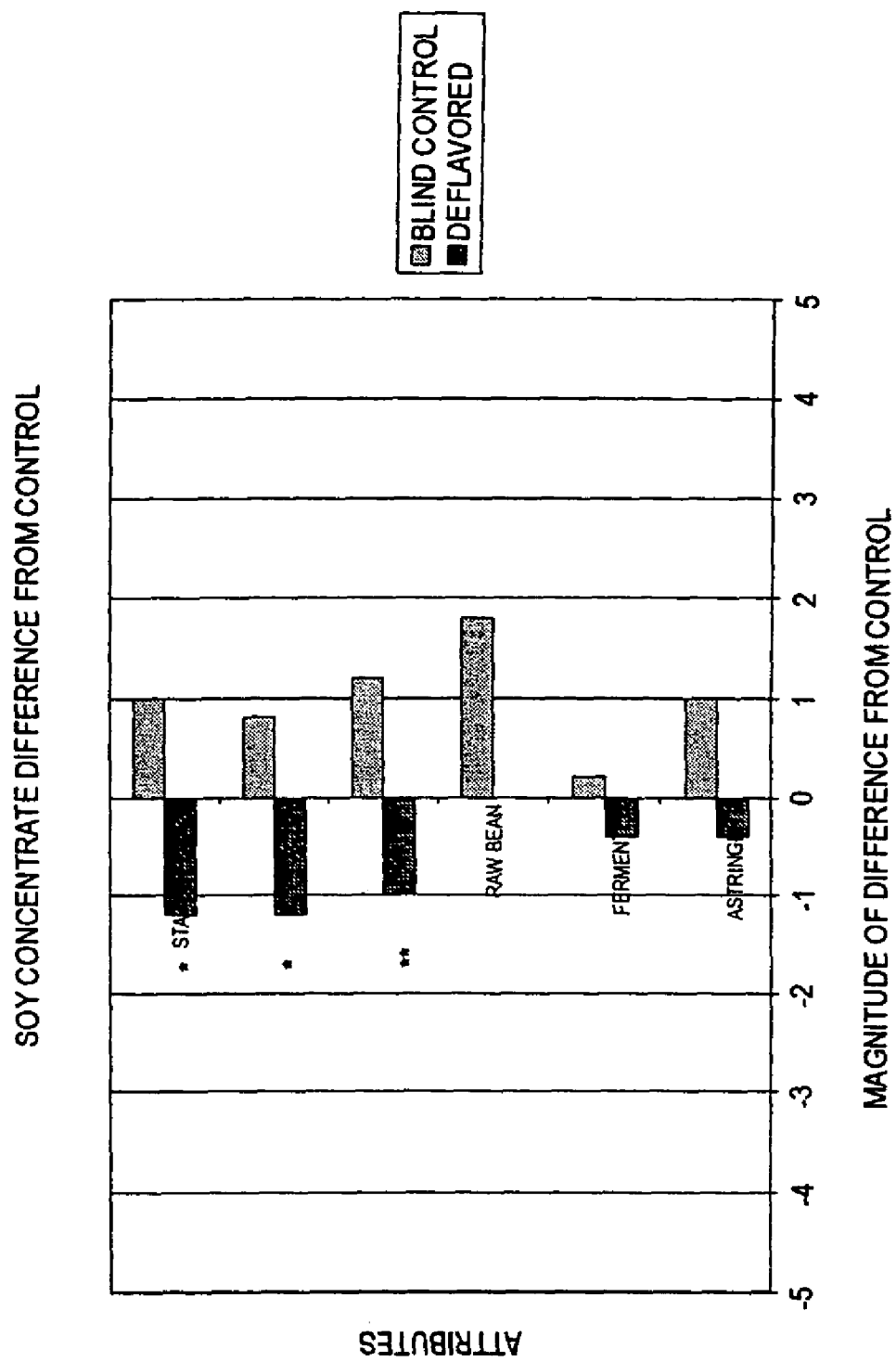
FIG. 5 is a graph of the intensity of deflavored soy concentrate and a control sample.

The deflavored soy protein concentrate was evaluated for six attributes by a trained sensory panel. The mean values for each attribute for the control sample (untreated) are given in FIG. 3. In this example a difference was found between the deflavored soy concentrate and the control, but none were at the 95 percent confidence level, although all the values were lower. This is shown in FIG. 4. Also included are the results of a blind control used, which was rated after the deflavored sample. In this case, the blind control was found to have stronger flavor attributes than the original control of FIG. 3. It is believed that this occurred because the blind control in this example was tested after the deflavored sample and appeared to the panel to have a relatively strong reflavor in the second evaluation of the control. However, when compared with the blind control sample, the deflavored sample showed significant differences for three of the flavor attributes at the 90 to 95 percent confidence level, as shown in FIG. 5.

EXAMPLE 8

The membrane used to deflavor soy proteins should have a molecular weight cutoff of 10,000 Daltons, shown to be effective in Examples 6 and 7. A higher molecular weight cutoff membrane can be used if desired, but at a molecular weight cutoff of 50,000 Daltons some valuable proteins have been lost in the permeate, as is shown in this example.

Five pounds (2.27 kg) is a dry soy isolate (Supro-670 PTI) was mixed with 95 pounds (43.2 kg) of water as in Example 7 to provide a slurry containing 5 percent soy solids. 1 N NaOH was added to raise the pH to 11 and solubilize the soy proteins. Diafiltration using five additions of water was carried out in a manner similar to that described in Examples 6 and 7 and using the hollow fiber membranes of Example 6. The pH was maintained at about 9 to about 12 during ultrafiltration/diafiltration. Samples of the permeate were taken at five minute intervals, neutralized and frozen for protein analysis.

The permeate samples were analyzed for total protein content by electrophoresis, with the results shown in the following table:

TABLE A

| | Molecular Weight Cutoff | |
|---|---|---|
| Time (minutes) | 10,000 Daltons Protein (%) | 50,000 Daltons Protein (%) |
| 0 | 0 | 0.4 |
| 5 | 0.6 | 1 |
| 10 | 0.8 | 0.6 |
| 15 | 0.4 | 0.6 |
| 20 | 0.4 | 0.6 |
| 25 | 0 | 0.4 |
| 30 | 0 | 0.4 |
| 35 | 0.5 | 0.4 |
| 40 | 0 | 0.3 |
| 45 | 0 | N/A |

It can be seen that the membrane having a 10,000 Dalton cutoff retains more protein than the membrane having a 50,000 Dalton cutoff. The value at 35 minutes for the 10,000 Dalton membrane is believed to be erroneous.

EXAMPLE 9

Samples of soy materials deflavored using the methods of Examples 6–8 were analyzed by protein gel electrophoresis. The results indicate that the molecular weight distribution of the retained soy materials was substantially the same as that of the original soy material. The results are shown in the following table:

an internal standard. The resulting mixtures were purged with 100 ml/min of helium at 60° C. for 20 min to remove the volatile compounds. The volatiles were analyzed by gas chromatography and the odor of the compounds judged by human criteria. The odors associated with specific chemical compounds are reported in the following table:

TABLE C

Odor Characteristics of Decreased Compounds After Deflavoring Process.

| Compound | Odor in SPI Control | Odor in Deflavored SPI |
|---|---|---|
| 1-pentanol | faint, green | weakly fatty |
| 2-ethylphenol | spicy, herbaceous | ND |
| 1-nitropentane | ND | ND |
| 1-octen-3-ol | mushroom, earthy, very strong | mushroom, earthy, strong |
| cis-2,4-heptadienal | ND | ND |
| cis-3-octen-2-one | ND | ND |
| trans-2,4-heptadienal | ND | weak green |
| acetophenone | burnt, floral, caramel | burnt, caramel |
| cis, trans-3,5-octadien-2-one | ND | ND |
| trans, trans-3,5-octadien-2-one | green, floral, fatty | fatty, green |
| 2,4-nonadienal | fatty, oily, deep-fried | fatty, oily, deep-fried |
| cis-2,4-decadienal | fatty, oily, musty | green onion, painty |
| 4-(1-methylpropyl)-phenol | bubblegum, fruity | ND |
| trans-2,4-decadienal | fatty, oily, waxy | fatty, oily, green |
| 2-pentylfuran | green, floral, etherous | green, floral, etherous |
| trans-3-octen-2-one | floral, green, earthy | floral |

TABLE B

| Molecular Weight (KD) | Soy Material | | | | | | | |
|---|---|---|---|---|---|---|---|---|
| | Soy Flavor | | Soy Isolate | | Soy Isolate | | Soy Milk | |
| | Control (%) | Deflavored (%) | Control (%) | Deflavored (%) | Control (%) | Deflavored (%) | Control (%) | Deflavored (%) |
| >26 | 74 | 73 | 21.7 | 19.7 | 22 | 20 | 69 | 71 |
| 14–27 | 18 | 19 | 30.8 | 32.2 | 31 | 32 | 20 | 21 |
| 3.5–14 | 7 | 8 | 47.4 | 48 | 45 | 48 | 10 | 9 |
| <3.5 | 0 | 0 | 0 | 0 | 0 | 0 | 0 | 0 |

EXAMPLE 10

Analysis were carried out for the chemical constituents associated with the flavor attributes determined by the sensory panels described in previous examples. Two samples of soy protein isolates were tested. One sample had been deflavored by the method described in Example 7; the second sample had not been deflavored.

Figure 6:
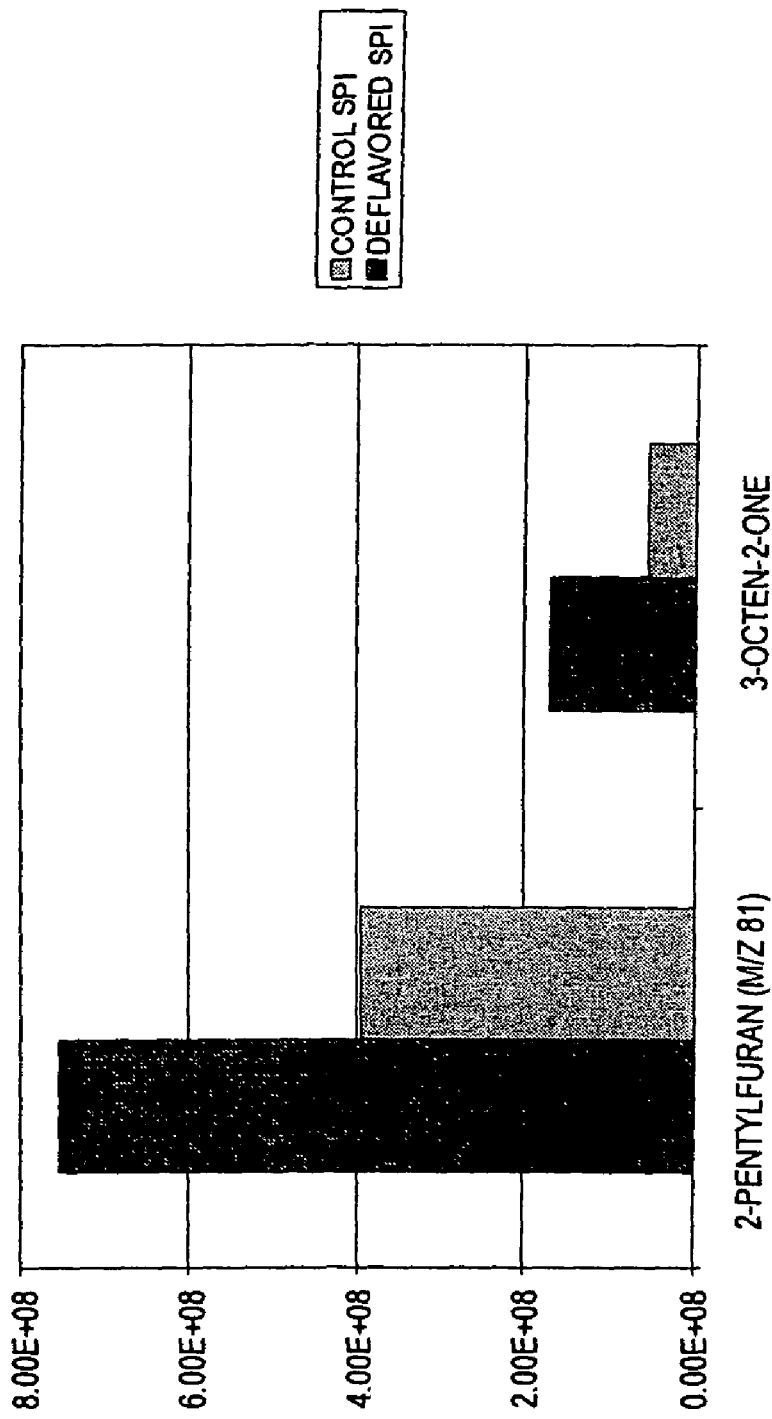
FIG. 6 is a graph showing the change in concentration of flavor compounds between a deflavored soy sample and a control sample.
Figure 7:
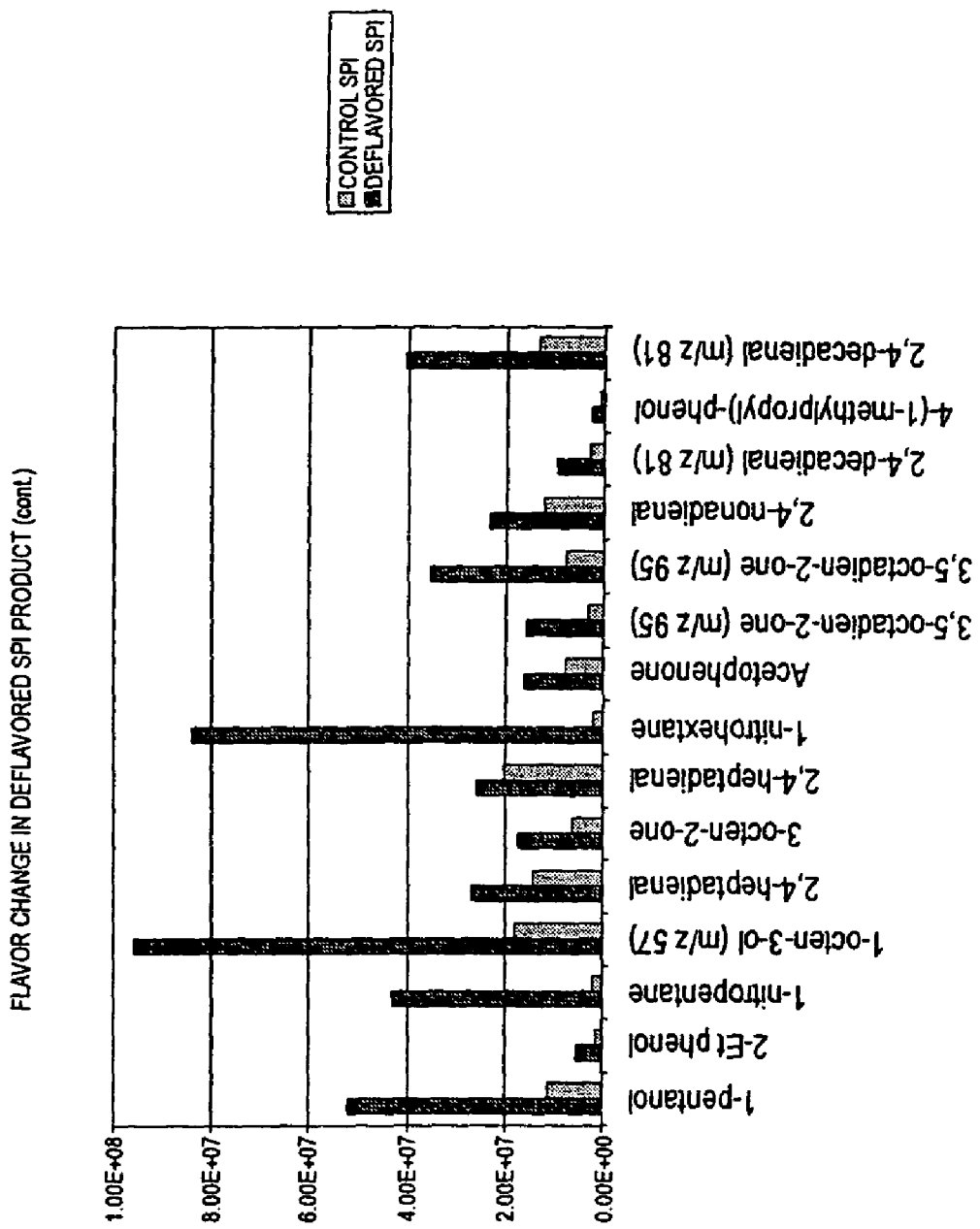
FIG. 7 is a graph showing the change in concentration of flavor compounds between a deflavored soy sample and a control sample.

In a first test, one gram of a control sample was diluted with 15 g of water, 2 μl of 300 ppm of 4-heptanone was added as an internal standard, and the mixture was purged with 100 ml/min of helium at 60° C. for 30 min. A deflavored sample was prepared similarly as the control sample, except that the pH was raised to 10 by adding a NaOH solution in order to solubilize the proteins. The volatile compounds were analyzed by GC/IMS (HP GC5890/MSD5972). The results for various compounds are shown in FIGS. 6 and 7. The deflavored soy sample contained smaller amounts of the flavoring compounds.

In a second test, three gram samples were diluted with 30 g of water and 2 μl of 300 ppm 4-heptanone was added as

EXAMPLE 11

Application of soy materials to food products was illustrated by adding deflavored soy material to a Balance Bar® (Kraft Foods) and comparing the flavor with an equivalent Balance Bar® containing the same soy material, but which had not been deflavored. In one sample all of the soy material was a dry soy isolate (Supro-661 from PTI), in the second sample 50 percent of the soy material had been deflavored by the diafiltration process of the exampl s and 50 percent was not deflavored. A taste panel preferred the second sample 8 to 3, scoring 6.11 on a scale of 1–10 (with 10 being the best), versus a score of 3.5 for the first sample.

EXAMPLE 12

Figure 9:
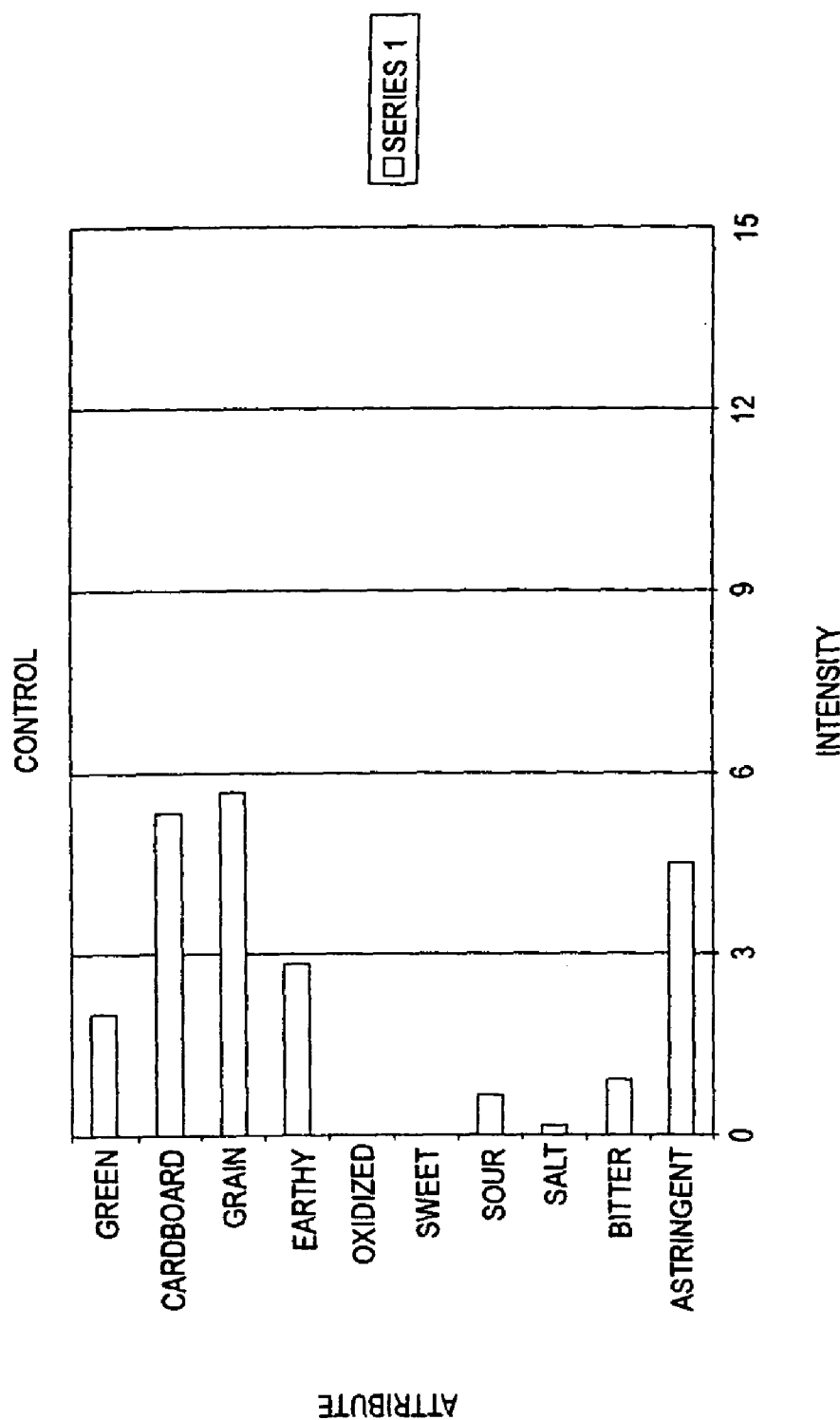
FIG. 9 is a graph of the intensity of soy isolate flavor attributes.
Figure 10:
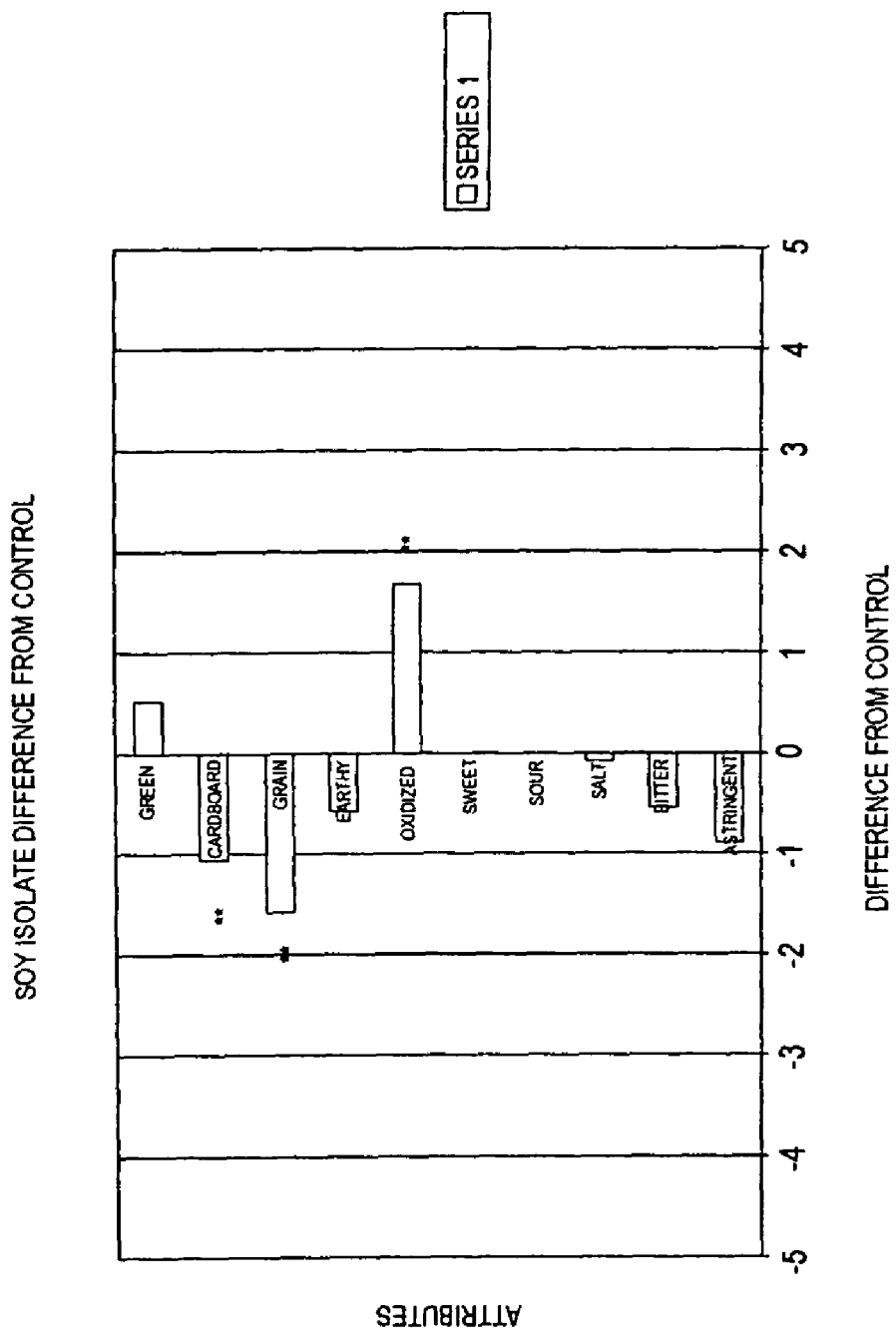
FIG. 10 is a graph of the intensity of deflavored soy isolate compared to a control sample.

In a manner similar to Example 6, samples of soy isolate were compared, deflavored according to the process of the invention and the control sample of soy isolate, concentrated in proteins was hydrated in water to a 10 percent solution. FIG. 9 shows the results found by a trained sensory panel for the control sample. The deflavored sample was compared to the control by the panel, which found, as can be seen in FIG. 10, that many of the characteristic attributes of the control sample had been reduced. However, it was found that the flavor designated oxidized had increased.

EXAMPLE 13

Defatted soy flour (30 lbs.; Archer Midland Daniels (AMD), Decatur, Ill.) was hydrated with water (270 lbs.) in a jacketed mixing tank with vigorous mixing at a temperature of about 130° F. Once hydration was complete (generally within about 15 minutes), the pH was adjusted to 10 using 1 N NaOH (approximately 15 lbs added). The pH-adjusted solution was mixed for about 30 to about 45 minutes at about 130° F. The resulting slurry was pumped through a continuous centrifuge (Westfalia Separator, Inc., Northvale, N.J.) at about 130° F. and 12000 rpm. The supernatant and insoluble sludge were continuously collected as separate streams. The collected supernatant was passed through the continuous centrifuge a second time under similar conditions to further remove insoluble material. The twice centrifuged supernatant was then diafiltered through a ultrafiltration membrane (spiral wound type with 10,000 molecular weight cut-off). Diafiltration was continued for an equivalent of 5 wash cycles (each wash defined as the amount of permeate collected equal to one-half of the initial batch size). The pH was maintained at about 10 during the ultrafiltration/diafiltration process. Once diafiltration was completed, citric acid (1%) was added to adjust the pH to 6.5. The resulting slurry was concentrated by ultrafiltration to about 10 to about 15 percent solids, pasteurized, and then spray dried.

EXAMPLE 14

This examples compares the deflavored soy material prepared by the method of this invention with similar materials prepared from prior art processes (i.e., U.S. Pat. No. 4,420,425 (issued Dec. 14, 1983) and U.S. Patent Application Publication 2002/0098276 (published Jul. 25, 2002). In each process, a defatted soy flour (Cargill, Inc.) was used as the starting material.

Inventive Process. Defatted soy flour (30 lbs.) was hydrated in 270 lbs water at 50° C. 1N NaOH solution was added slowly to the soy slurry to adjust the pH to 10.0. Extraction of soy proteins was carried for about 30 minutes at 50° C. At the end of the extraction, the slurry was centrifuged at 12000G using a continuous Westfalia separator (Model SC-6) with continuous de-slugging of spent material and a feed rate of about 300 L/hr. The supernatant was collected and re-centrifuged. The extracted protein slurry was then diafilterd through a UF membrane with molecular weight cutoff of 10000 Daltons at about 50° C.; retentate was recirculated and water was added at the same rate of permeate removal. The pH was maintained at 10.0 for the duration of diafiltration. Diafiltration continued until permeate collected was equal 2.5x the starting batch volume (i.e., 5 washes). Once diafiltration was complete, the retentate was concentrated to 10 percent solids and the pH was adjusted to 6.5 with 1 percent citric acid. The product was then collected and spray dried.

Comparative Process 1 (Based on U.S. Pat. No. 4,420,425). Defatted soy flour (30 lbs) was hydrated in 270 lbs water at ambient temperature. 1N NaOH solution was added slowly to the soy slurry to adjust the pH to 9.0. Extraction of soy proteins was carried for 40 minutes at 55° C. At the end of the extraction, the slurry was centrifuged at 12000G using a continuous Westfalia separator (Model SC-6) with continuous de-slugging of spent material and a feed rate of about 300 L/hr. The supernatant was collected and re-centrifuged. After the second centrifugation, the pH had dropped to 7.5. The extracted protein slurry was then dia-filterd through a ultrafiltration membrane with molecular weight cutoff of 30000 Daltons at about 50° C.; retentate was recirculated and water was added at the same rate of permeate removal. Th pH was not controlled during diafiltration and had dropped to 7.0 by the completion of the diafiltration. Diafiltration continued until permeate collected was equal 2.5x the starting batch volume (i.e., 5 washes). Once diafiltration was complete, the retentate was concentrated to 10 percent solids and the pH was adjusted to 6.5 with 1 percent citric acid. The product was then collected and spray dried.

Comparative Process 2 (Based on U.S. Patent Application Publication 2002/0098276). Defatted soy flour (30 lbs) was hydrated in 270 lbs water at 25° C. 1N NaOH solution was added slowly to the soy slurry to adjust the pH to 9.0. Extraction of soy proteins was carried for 30 minutes. At the end of the extraction, the slurry was centrifuged at 12000G using a continuous Westfalia separator (Model SC-6) with continuous de-slugging of spent material and a feed rate of about 300 L/hr. The supernatant was collected and re-centrifuged. After the second centrifugation, the pH had dropped to 8.0. The extracted protein slurry was then dia-filterd through a ultrafiltration membrane with molecular weight cutoff of 100,000 Daltons at about 25° C.; retentate was recirculated and water was added at the same rate of permeate removal. The pH was not controlled during diafiltration and had dropped to 7.5 by the completion of the diafiltration. Diafiltration continued until permeate collected was equal 2.5x the starting batch volume (i.e., 5 washes). Once diafiltration was complete, the retentate was concentrated to 10 percent solids and the pH was adjusted to 6.5 with 1 percent citric acid. The product was then collected and spray dried.

The deflavored soy material obtained from each of the processes were evaluated. Taste was evaluated using a trained panel. Although each of the samples were acceptable (i.e., suitable reduction of soybean flavor profile), the inventive product have the best overall flavor profile. Functional properties (e.g., solubility, water retention, and the like) were also determined; the results are present in the table below:

| | | Solubility | | Water Retention |
|---|---|---|---|---|
| Sample | Particle Size (μm) | % | Nitrogen Solubility Index | (g water/g protein) |
| Inventive Process | 20.2 | 62.4 | 93.0 | 6.1 |
| Comparative Process 1 | 115.7 | 59.9 | 77.9 | 3.8 |
| Comparative Process 2 | 44.6 | 14.5 | 22.7 | 4.9 |

Especially for use in low viscosity food products (e.g., beverages, salad dressings, and the like), it is especially important that the solubility is high and the average particle size is small in order to provide good appearance and mouth feel. Low solubility results in sediment formation and gritty mouth feel; larger particles also results in undesirable gritty and/or chalky mouth feel.

The particle size of the material produced by the inventive process was significantly less than materials prepared from either of the other processes. Particle microstructure was also examined using microscopy. The material from the inventive process were transparent with relative thin walls. Material produced from Comparative Process 1 had both thin and thick walls whereas the material produced from Comparative Process 2 had thick walls. Thin wall particles will tend to be lighter than thick wall particles and will, therefore, tend to more easily form a suspension and to remain in suspension longer, thereby providing better mouth feel when incorporated into food prducts.

The inventive process provided deflavored soy materials with significantly higher solubility and water retention than either of the two comparative process.

The invention claimed is:

1. A method for preparing deflavored soy protein material, said method comprising:
   (a) preparing an aqueous composition of a soy material containing soluble soy proteins, flavoring compounds, and insoluble materials;
   (b) solubilizing the soy proteins by adjusting the aqueous composition of (a) to a pH in the range of about 9 to about 12 and releasing the flavoring compounds;
   (c) removing the insoluble materials from the pH-adjusted aqueous composition of (b) to obtain a treated aqueous composition;
   (d) passing the treated aqueous composition of (c) adjacent an ultrafiltration membrane having a molecular weight cutoff up to about 50,000 Daltons, while maintaining the pH in the range of about 9 to about 12, under suitable ultrafiltration conditions wherein the flavor compounds pass through the membrane, thereby deflavoring the soy material and retaining substantially all of the solubilized soy proteins; and
   (e) recovering the solubilized soy proteins retained by the ultrafiltration membrane to obtain the deflavored soy protein material.

2. The method of claim 1, wherein the soy material is at least one member of the group consisting of soy milk, soy protein isolate, soy concentrate, and soy flour.

3. The method of claim 1, wherein the soy material is soy flour.

4. The method of claim 3, wherein the soy flour is defatted soy flour.

5. The method of claim 2, wherein the insoluble materials are removed from the pH-adjusted aqueous composition using at least one centrifugation step.

6. The method of claim 4, wherein the insoluble materials are removed from the pH-adjusted aqueous composition using at least one centrifugation step.

7. The method of claim 5, wherein the aqueous composition of (a) has a concentration of soy material in the range of about 1 to about 20 percent.

8. The method of claim 6, wherein the aqueous composition of (a) has a concentration of soy material in the range of about 1 to about 20 percent.

9. The method of claim 5, wherein the ultrafiltration membrane has a cutoff in the range of about 1,000 to about 50,000 Daltons.

10. The method of claim 6, wherein the ultrafiltration membrane has a cutoff in the range of about 1,000 to about 50,000 Daltons.

11. The method of claim 9, wherein the ultrafiltration membrane has a cutoff in the range of about 10,000 to about 30,000 Daltons.

12. The method of claim 10, wherein the ultrafiltration membrane has a cutoff in the range of about 10,000 to about 30,000 Daltons.

13. The method of claim 11, wherein the ultrafiltration is carried out at a temperature in the range of about 10 to about 60° C. and a suitable pressure.

14. The method of claim 12, wherein the ultrafiltration is carried out at a temperature in the range of about 10 to about 60° C. and a suitable pressure.

15. The method of claim 13, wherein the ultrafiltration membrane is a polymer, ceramic, or inorganic membrane.

16. The method of claim 14, wherein the ultrafiltration membrane is a polymer, ceramic, or inorganic membrane.

17. The method of claim 1, wherein the deflavored soy protein material is further treated to remove water to obtain a solid deflavored soy protein material.

18. The method of claim 5, wherein the deflavored soy protein material is further treated to remove water to obtain the deflavored soy protein material in a solid form.

19. The method of claim 6, wherein the deflavored soy protein material is further treated to remove water to obtain the deflavored soy protein material in a solid form.

20. The method of claim 1, wherein the deflavored soy protein material is spray dried to remove water to obtain the deflavored soy protein material in a solid form.

21. The method of claim 5, wherein the deflavored soy protein material is spray dried to remove water to obtain the deflavored soy protein material in a solid form.

22. The method of claim 6, wherein the deflavored soy protein material is spray dried to remove water to obtain the deflavored soy protein material in a solid form.

* * * * *